(12) United States Patent
Kim et al.

(10) Patent No.: US 12,009,534 B2
(45) Date of Patent: Jun. 11, 2024

(54) SECONDARY BATTERY

(71) Applicant: LG Energy Solution, Ltd., Seoul (KR)

(72) Inventors: Hyoung Kwon Kim, Daejeon (KR); Hyeon Soo Sim, Daejeon (KR); Ha Young Heo, Daejeon (KR); Duk Hyun Ryu, Daejeon (KR); Nam Won Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 106 days.

(21) Appl. No.: 17/291,856

(22) PCT Filed: Jan. 31, 2020

(86) PCT No.: PCT/KR2020/001529
§ 371 (c)(1),
(2) Date: May 6, 2021

(87) PCT Pub. No.: WO2020/159313
PCT Pub. Date: Aug. 6, 2020

(65) Prior Publication Data
US 2022/0013833 A1    Jan. 13, 2022

(30) Foreign Application Priority Data
Feb. 1, 2019   (KR) .................. 10-2019-0013848

(51) Int. Cl.
*H01M 50/166*   (2021.01)
*H01M 50/147*   (2021.01)
(Continued)

(52) U.S. Cl.
CPC ....... *H01M 50/166* (2021.01); *H01M 50/147* (2021.01); *H01M 50/152* (2021.01);
(Continued)

(58) Field of Classification Search
CPC .. H01M 50/30; H01M 50/308; H01M 50/325; H01M 50/35; H01M 50/358; H01M 50/367
See application file for complete search history.

(56) References Cited

U.S. PATENT DOCUMENTS 7,858,217 B1   12/2010   Goda et al.
8,962,167 B2*  2/2015   Kim ................... H01M 50/171
                                                    429/185

(Continued)

FOREIGN PATENT DOCUMENTS

CN   101601149 A   12/2009
CN   103797611 A   5/2014
(Continued)

OTHER PUBLICATIONS

Quin, Energy Density of Cylindrical Li-ion Cells: A comparison of the Commercial 18650 and 21700 cells, Aug. 2018, Journal of The Electrochemical Society 164 (14) A3284-A3291 (Year: 2018).*
(Continued)

*Primary Examiner* — Matthew T Martin
*Assistant Examiner* — Bartholomew A Hornsby
(74) *Attorney, Agent, or Firm* — Lerner David LLP

(57) ABSTRACT

According to one aspect of the present invention, a secondary battery has a bent part disposed on an end of an upper portion of the battery can. The bent part is bent inward toward a top cap to fix the top cap. The secondary battery is configured such that, when an internal pressure of the battery can exceeds a predetermined value, a region (R) in which the top cap and the bent part overlap each other when viewed from above is reduced by deformation of the top cap or the bent part to allow an entire region of the top cap to become spaced further from the battery can.

12 Claims, 1 Drawing Sheet

(51) Int. Cl.
*H01M 50/152* (2021.01)
*H01M 50/30* (2021.01)
*H01M 50/578* (2021.01)
*H01M 50/581* (2021.01)

(52) U.S. Cl.
CPC ......... *H01M 50/30* (2021.01); *H01M 50/578* (2021.01); *H01M 50/581* (2021.01); *H01M 2200/10* (2013.01); *H01M 2200/20* (2013.01)

(56) References Cited

U.S. PATENT DOCUMENTS

| | | | |
|---|---|---|---|
| 2007/0212595 A1* | 9/2007 | Kim | H01M 50/171 429/174 |
| 2010/0021812 A1* | 1/2010 | Kim | H01M 10/0525 429/185 |
| 2012/0276441 A1 | 11/2012 | Kim et al. | |
| 2013/0040176 A1 | 2/2013 | Tyler et al. | |
| 2014/0377599 A1* | 12/2014 | Shimizu | H01M 10/0431 429/53 |
| 2015/0044525 A1 | 2/2015 | Jourdren et al. | |
| 2015/0364734 A1 | 12/2015 | Kunoike et al. | |
| 2015/0364735 A1 | 12/2015 | Kohira et al. | |
| 2016/0099443 A1* | 4/2016 | Lee | H01M 50/152 429/7 |
| 2017/0301899 A1* | 10/2017 | Lee | H01M 50/171 |
| 2018/0241012 A1* | 8/2018 | Ue | H01M 50/30 |
| 2020/0091469 A1 | 3/2020 | Sodeyama | |

FOREIGN PATENT DOCUMENTS

| | | |
|---|---|---|
| CN | 206148480 U | 5/2017 |
| CN | 107302062 A | 10/2017 |
| JP | H09120811 A | 5/1997 |
| JP | H11111244 A | 4/1999 |
| JP | 2001155778 A | 6/2001 |
| KR | 20010047791 A | 6/2001 |
| KR | 20020007390 A | 1/2002 |
| KR | 20060032369 A | 4/2006 |
| KR | 20080053538 A | 6/2008 |
| KR | 20110100473 A | 9/2011 |
| KR | 20140146128 A | 12/2014 |
| KR | 20170117748 A | 10/2017 |
| KR | 20180080528 A | 7/2018 |
| WO | 2014119308 A1 | 8/2014 |
| WO | 2014119309 A1 | 8/2014 |
| WO | WO-2017094228 A1 * | 6/2017 ............ H01M 10/04 |
| WO | 2018225394 A1 | 12/2018 |

OTHER PUBLICATIONS

Quinn, "Energy Density of Cylindrical Li-ion Cells: A comparison of the Commercial 18650 and 21700 cells," (Journal of The Electrochemical Society 164 (14) A3284-A3291, 2018). (Year: 2018).*

International Search Report for Application No. PCT/KR2020/001529, dated May 14, 2020, 2 pages.

Extended European Search Report for EP Application No. 20749393 dated Dec. 15, 2021, 3 pgs.

Search Report dated Nov. 1, 2022 from the Office Action for Chinese Application No. 202080006945.8 dated Nov. 9, 2022, 2 pages.

* cited by examiner

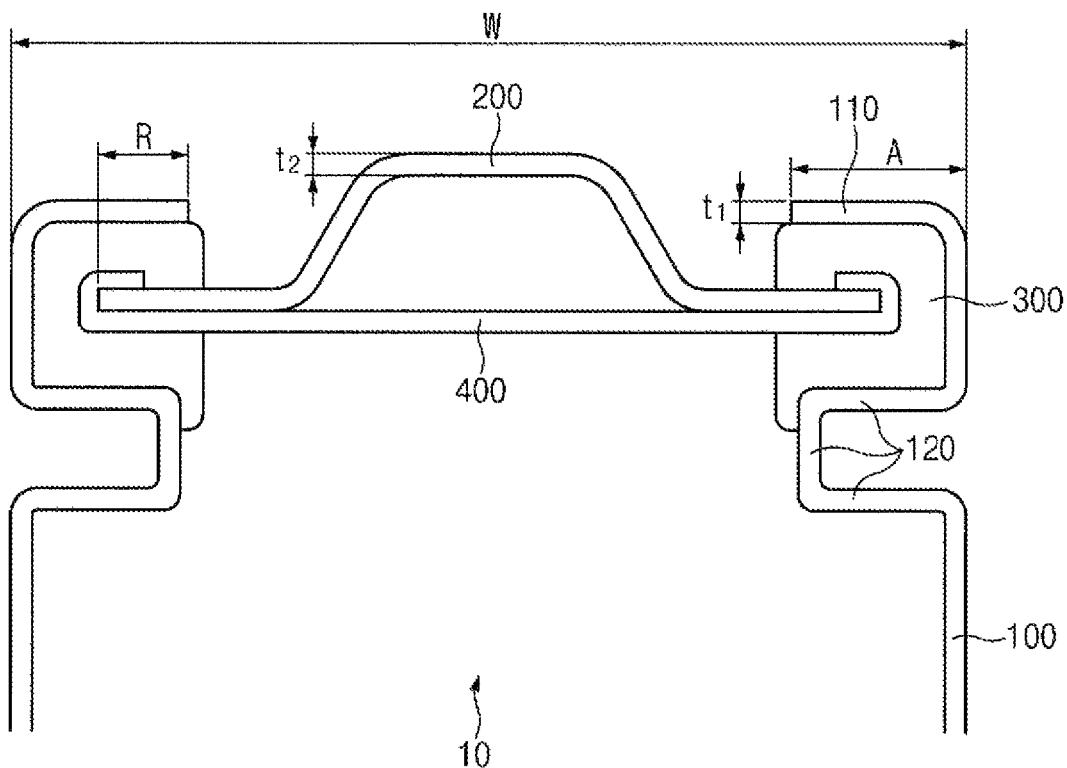

SECONDARY BATTERY

CROSS-REFERENCE TO RELATED APPLICATIONS

The present application is a national phase entry under 35 U.S.C. § 371 of International Application No. PCT/KR2020/001529 filed Jan. 31, 2020, which claims the benefit of the priority of Korean Patent Application No. 10-2019-0013848, filed on Feb. 1, 2019, which are hereby incorporated by reference in their entirety.

TECHNICAL FIELD

The present invention relates to a secondary battery, and more particularly, to a secondary battery having a structure that is capable of effectively discharging a gas when an internal pressure of the secondary battery increases.

BACKGROUND ART

Secondary batteries that are repetitively chargeable and dischargeable may be divided into pouch type secondary batteries, prismatic type secondary batteries, and cylindrical type secondary batteries according to their structures and manufacturing methods. Among them, such a cylindrical type secondary battery has a structure in which an electrode assembly is accommodated in a battery can, and a top cap is coupled to an upper portion of the battery can.

As the demands for a secondary battery having a larger capacity compared to the secondary batteries according to the related art has increased, studies on secondary batteries have also been actively conducted.

In order to manufacture secondary batteries having larger capacity, the content of nickel contained in a positive electrode active material within a positive electrode is increased. However, as the content of nickel contained in the positive electrode active material increases, there is a problem in that thermal stability of the positive electrode active material is deteriorated. The deterioration in thermal stability of the positive electrode active material means that the possibility of fire or explosion of the secondary battery increases due to an increase in temperature or pressure within the secondary battery.

In order to solve this problem, a method of adding a compound that is capable of improving the thermal stability of the secondary battery may be considered. However, in reality in such a method, there are limitations in terms of cost and productivity.

DISCLOSURE OF THE INVENTION

Technical Problem

Therefore, an object of the prevent invention for solving the above problems is to remove a risk of fire or explosion of a secondary battery, which occurs when a pressure or temperature within the secondary battery increases, by optimizing a structure of the secondary battery.

Technical Solution

According to one aspect of the present invention for achieving the above object, a secondary battery includes: an electrode assembly; a battery can configured to accommodate the electrode assembly and having an opened upper portion; and a top cap bonded to the upper portion of the battery can, wherein a bent part that is bent inward toward the top cap to fix the top cap is disposed on an end of the upper portion of the battery can, and when an internal pressure of the battery can exceeds a predetermined value, a region (R) in which the top cap and the bent part overlap each other when viewed from above is reduced by deformation of the top cap or the bent part to allow an entire region of the top cap to be spaced apart from the battery can.

When the internal pressure of the battery can exceeds the predetermined value, the top cap may be spaced apart from the battery can in a state of being integrated without being fragmented into a plurality of fragments.

When the internal pressure of the battery can exceeds the predetermined value, a bent degree of the bent part may be alleviated to allow the top cap to be spaced apart from the battery can.

When the internal pressure of the battery can exceeds the predetermined value, a central portion of the top cap may be bent upward to allow the top cap to be spaced apart from the battery can.

The predetermined value may correspond to a value within a range of 30 kgf to 60 kgf.

The battery can may have a width (W), the bent part may have a bent length (A), and a ratio A/W of the bent length (A) of the bent part to the width (W) of the battery can may range from $2.27 \times 10^{-2}$ to $7.5 \times 10^{-2}$.

The bent part may have a thickness (t1), the bent part may have a bent length (A), and a ratio A/t1 of the bent length (A) of the bent part to the thickness (t1) of the bent part may range from 1.43 to 6.

A terminal region protruding upward from the top cap may have a thickness (t2), the bent part may have a bent length (A), and a ratio A/t2 of the bent length (A) of the bent part to the thickness (t2) of the terminal region of the top cap may range from 1 to 5.

The bent length (A) of the bent part may range from 0.5 mm to 1.5 mm.

The width (W) of the battery can may range from 20 mm to 22 mm.

The thickness (t1) of the bent part may range from 0.25 mm to 0.35 mm.

The thickness (t2) of the terminal region of the top cap may range from 0.3 mm to 0.5 mm.

The battery can may include an iron (Fe) material containing nickel (Ni).

Advantageous Effects

According to the present invention, the structure of the secondary battery may be optimized to remove the risk of fire or explosion of the secondary battery, which occurs when the pressure or temperature within the secondary battery increases.

BRIEF DESCRIPTION OF THE DRAWINGS

The FIGURE is a side cross-sectional view illustrating a structure of a secondary battery according to the present invention.

MODE FOR CARRYING OUT THE INVENTION

Hereinafter, a structure of a secondary battery according to the present invention will be described with reference to the accompanying drawings.

Secondary Battery

The FIGURE is a side cross-sectional view illustrating a structure of a secondary battery according to the present invention.

As illustrated in the FIGURE, a secondary battery 10 according to the present invention may include an electrode assembly (not shown), a battery can 100 accommodating the electrode assembly and having an open upper portion, and a top cap 200 coupled to the upper portion of the battery can 100. As illustrated in the FIGURE, the top cap 200 may have a structure in which a central portion protrudes upward. Hereinafter, in this specification, an upward protruding region of the top cap 200 will be called a 'terminal region'.

The secondary battery according to the present invention may be, for example, a cylindrical type secondary battery, but the type of secondary battery to which the present invention is applied is not limited thereto. Also, the battery can 100 may have a cylindrical shape, but the shape of the battery can 100 is not limited thereto. The battery can 100 may include an iron (Fe) material containing nickel (Ni).

A gasket 300 for sealing may be provided between an inner upper portion of the battery can 100 and an outer circumference of the top cap 200. Also, a safety vent 400 may be provided in close contact with a bottom surface of the top cap 200.

Continuing, with reference to the FIGURE, a bent part 110 that is bent inward toward the top cap 200 may be disposed on an end of the upper portion of the battery can 100. As illustrated in the FIGURE, since the bent part 110 presses a gasket 300 downward, the top cap 200 may be fixed by the bent part 110. A beading portion 120 having a shape that is recessed inward into the battery can 100 may be disposed below the bent part 110.

Here, as illustrated in the FIGURE, when the secondary battery 10 is viewed from above, a region R (hereinafter, referred to as an 'overlapping region') in which the top cap 200 and the bent part 110 overlap each other may be defined.

The secondary battery 10 according to the present invention may have a structure in which, when pressure within the secondary battery increases, an entire region of the top cap 200 becomes spaced apart from the battery can 100 to discharge a gas within the secondary battery 10 to the outside.

For this, the secondary battery 10 according to the present invention may have a structure in which, when a pressure within the secondary battery exceeds a predetermined value, the top cap or the bent part 110 is deformed in shape to reduce an area of the overlapping region R between the top cap 200 and the bent part 110 when viewed from above so as to reduce bonding force between the top cap 200 and the bent part 110, such that the entire region of the top cap 200 becomes spaced apart from the battery can 100.

In the secondary battery 10 according to the present invention, when the internal pressure of the battery can 100 exceeds a predetermined value, a manner in which the entire region of the top cap 200 becomes spaced apart from the battery can 100 may be largely divided into two manners.

First, there is a manner (hereinafter, referred to as a 'first spacing manner') in which the top cap 200 and the gasket 300 press the bent part 110 disposed on the end of the upper portion of the battery can 100 upward due to an increase in internal pressure of the secondary battery 10 to alleviate a degree to which the bent part 100 is bent, and thus, the bent part 110 and the top cap 200 are slid with respect to each other in the overlapping region R to allow the top cap 200 to be spaced apart from the battery can 100.

Second, there is a manner (hereinafter, referred to as a 'second spacing manner') in which the internal pressure of the secondary battery 10 presses a bottom surface of a central portion of the top cap 200 upward due to an increase in internal pressure of the secondary battery 10 to allow a central portion (i.e., a terminal region) of the top cap 200 to be bent upward, and thus, the bent part 110 and the top cap 200 are slid with respect to each other in the overlapping region R to allow the top cap 200 to be spaced apart from the battery can 100.

The above-described manners may not selectively occur but rather may simultaneously occur with each other when the entire region of the top cap 200 is spaced apart from the battery can 100.

When the entire region of the top cap is spaced apart from the battery can due to the increase in internal pressure of the secondary battery, if the top cap is spaced apart from the battery can in a state of being fragmented into a plurality of fragments, the plurality of fragments may be scattered in various directions, causing safety accidents.

In the secondary battery 10 according to the present invention, when the internal pressure of the battery can 100 exceeds the predetermined value, the top cap 200 may become spaced apart from the battery can 100 in a state in which the top cap 200 is integrated without being fragmented into a plurality of fragments.

As described above, in the secondary battery 10 according to the present invention, when the pressure within the secondary battery exceeds the predetermined value, the entire region of the top cap 200 may become spaced apart from the battery can 100 due to the deformation in shape of the top cap 200 or the bent part 110. Here, the predetermined value may be a value within a range of 30 kgf to 60 kgf.

When the predetermined value is less than 30 kgf, the bonding between the top cap 200 and the battery can 100 may be too week. As a result, even if the gas inside the secondary battery does not need to be discharged to the outside, the top cap 200 may become spaced apart from the battery can 100. On the other hand, when the predetermined value exceeds 60 kgf, the bonding between the top cap 200 and the battery can 100 may be too strong. As a result, even if the gas needs to be discharged to the outside due to the increase in internal pressure of the secondary battery 100, the top cap 200 may not become spaced apart from the battery can 100. More preferably, the predetermined value may be a value within a range of 30 kgf to 55 kgf.

As illustrated in the FIGURE, in the secondary battery 10 according to the present invention, the battery can 100 may have a predetermined width W. When the battery can 100 has a cylindrical shape, the width W illustrated in the FIGURE may be regarded as a diameter of the battery can 100.

Also, the bent part 110 disposed on the battery can 100 may have a bent length A that is a predetermined length by which the bent part is bent towards the inside of the battery can 100. Also, the bent part 110 may have a predetermined thickness t1.

The top cap 200 may have a predetermined thickness t2. The top cap 200 may have a constant thickness over the entire region thereof. However, for convenience, in this specification, the case in which the terminal region protruding upward from the top cap 200 has a thickness t2 will be described as an example.

In the secondary battery 10 according to the present invention, a ratio of the bent length A of the bent part 110 to the width W of the battery can 100 may be constant. That is, the ratio A/W of the bent length A of the bent part 110 to the width W of the battery can 100 may range of $2.27 \times 10^{-2}$ to $7.5 \times 10^{-2}$.

When the ratio A/W is less than $2.27 \times 10^{-2}$, the bonding force between the battery can 100 and the top cap 200 may be too small. As a result, the bent part 110 may be deflected even in a situation in which the internal pressure of the secondary battery 10 is normal, which may cause a problem in which the top cap 200 becomes spaced apart from the battery can 100. Conversely, when the ratio A/W exceeds $7.5 \times 10^{-2}$, the bonding force between the battery can 100 and the top cap 200 may be too large. As a result, the top cap 200 may not become spaced apart from the battery can 100 in a situation in which the internal pressure of the secondary battery 10 is abnormal, which may cause a risk of explosion of the secondary battery 10.

Also, in the secondary battery 10 according to the present invention, a ratio of the bent length A of the bent part 110 to the thickness t1 of the bent part 110 may also be constant. That is, the ratio A/t1 of the bent length A of the bent part 110 to the thickness t1 of the bent part 110 may range of 1.43 to 6.

When the ratio A/t1 is less than 1.43, the thickness t1 of the bent part 110 may be relatively large, but the bent length A may be relatively short. As a result, it may be difficult to mold the bent part 110 on the end of the upper portion of the battery can, and thus, moldability of the bent part 110 may be deteriorated. On the other hand, when the ratio A/t1 exceeds 6, the thickness t1 of the bent part 110 may be relatively small, but the bent length A may be relatively large. As a result, durability of the region in which the bent part is formed may be deteriorated so as to cause damage of the bent part 110 while the bent part 110 is molded. More preferably, the ratio A/t1 may range of 2.0 to 4.3.

Also, in the secondary battery 10 according to the present invention, a ratio of the bent length A of the bent part 110 to the thickness t2 of the terminal region of the top cap 200 may also be constant. That is, the ratio A/t2 of the bent length A of the bent part 110 to the thickness t2 of the terminal region of the top cap 200 may range from 1.0 to 5.0.

When the ratio A/t2 is less than 1.0, the thickness t2 of the terminal region of the top cap 200 may be relatively large, but the bent length A may be relatively small. As a result, the deformation in the terminal region of the top cap 200 may almost fail to occur, and thus, when the entire region of the top cap 200 is spaced apart from the battery can 100 due to the increase in internal pressure of the secondary battery 10, the spacing may be mainly realized by only the 'first spacing manner'. On the other hand, the ratio A/t2 exceeds 5.0, the thickness t2 of the terminal region of the top cap 200 may be relatively small, but the bent length A may be relatively large. As a result, the alleviation of the bent degree in the bent length A may almost fail to occur, and thus, when the entire region of the top cap 200 is spaced apart from the battery can 100 due to the increase in internal pressure of the secondary battery 10, the spacing may be mainly realized by only the 'second spacing manner'. If the spacing depends on only the first spacing manner when the entire region of the top cap 200 is spaced apart from the battery can 100, when the first spacing manner may not be performed according to the state of use of the secondary battery, the top cap 200 may not be spaced apart from the battery can 100, and thus, the secondary battery 10 may explode. This is the same even when depending on only the second separation method. Therefore, in order to allow the top cap 200 to be spaced apart from the secondary battery 10 regardless of the state of use of the secondary battery, it is necessary to set the ratio A/t2 so that the first spacing manner and the second spacing manner are performed in harmony.

The bent length A of the bent part 110 of the secondary battery 10 according to the present invention may range of 0.5 mm to 1.5 mm.

When the bent length A of the bent part 110 is less than 0.5 mm, the bent length A may be too short. As a result, it is difficult to mold the bent part 110 on the end of the upper portion of the battery can 100, and thus, the moldability of the bent part 110 may be deteriorated. In addition, the bonding force between the battery can 100 and the top cap 200 may be deteriorated in due course by the bent part 110, which could cause a problem in which the top cap 200 becomes spaced apart from the battery can 100 even in a normal situation. On the other hand, when the bent length A of the bent part 110 exceeds 1.5 mm, the bent length A may be too long. As a result, the bonding force between the battery can 100 and the top cap 200 may excessively large, and thus, the top cap 200 may not become spaced apart from the battery can 100 even in the situation in which the top cap 200 has to be spaced apart from the battery can 100 due to the increase in internal pressure of the secondary battery 10. Therefore, the secondary battery may explode.

Also, the thickness t1 of the bent part 110 provided in the battery can 100 of the secondary battery 10 according to the present invention may range of 0.25 mm to 0.35 mm.

When the thickness t1 of the bent part 110 is less than 0.25 mm, the durability of the region in which the bent part 110 is disposed may be deteriorated, which could cause a problem in which the bent part 110 is damaged in the process of forming the bent part 110. On the other hand, when the thickness t1 of the bent part 110 exceeds 0.35 mm, it may be difficult to mold the bent part 110 on the upper end of the battery can 100, thereby deteriorating the moldability of the bent part 110.

Also, the thickness t2 of the top cap 200 of the secondary battery 10 according to the present invention may range of 0.3 mm to 0.5 mm.

If the thickness t2 of the top cap 200 is less than 0.3 mm, when the entire region of the top cap 200 is spaced apart from the battery can 100 due to the increase in internal pressure of the secondary battery 10, the spacing may be mainly realized by only the 'second spacing manner'. On the other hand, if the thickness t2 of the top cap 200 exceeds 0.3 mm, when the entire region of the top cap 200 is spaced apart from the battery can 100 due to the increase in internal pressure of the secondary battery 10, the spacing may be mainly realized by only the 'first spacing manner'. More preferably, the thickness t2 may have a value between 0.35 mm and 0.45 mm.

Also, the width W of the battery can 100 of the secondary battery 10 according to the present invention may range of 20 mm to 22 mm to improve productivity of the secondary battery 10 and efficiency when using the secondary battery 10.

In the case of the cylindrical type secondary battery, it may be common that the safety vent 400 (see the FIGURE) is provided. According to the related art, when the internal pressure of the cylindrical type secondary battery increases, the safety vent may be broken to discharge a gas and an electrolyte within the secondary battery to the outside, thereby preventing the secondary battery from exploding.

However, according to the related art, even if the safety vent is broken, there may be a problem in that the discharge of the gas and the electrolyte within the secondary battery is limited to the broken region in the safety vent, and thus it may be difficult to quickly discharge the gas and the electrolyte. Particularly, when the diameter or size of the secondary battery are large, for example, when the diameter of the secondary battery exceeds 11 mm, it may be necessary to discharge the gas and the electrolyte as quickly as possible to prevent the explosion of the secondary battery. However, since the broken region in the safety vent is local, there may be a problem in that the safety of the secondary battery is cannot be maintained because the gas and the electrolyte are not quickly discharged to the outside. Also, even if the safety vent is broken, the top cap may be maintained in the state of being bonded to the battery can. As a result, the safety vent may still be constrained to the lower portion of the top cap, thus limiting the size of the broken and opened region in the safety vent by the top cap.

However, as described above, according to the present invention, when the internal pressure of the battery can 100 exceeds a predetermined value, since the bonding force between the bent part 110 of the battery can 100 and the top cap 200 is reduced to allow the entire region of the top cap 200 to be spaced apart from the battery can 100, the gas and the electrolyte within the secondary battery may be quickly discharged to the outside. Also, since the top cap is spaced apart from the battery can, the size of the broken and opened region of the safety vent may not be limited by the top cap. As a result, the size of the broken region of the safety vent may increase to quickly discharge the gas and the electrolyte within the secondary battery to the outside.

Embodiment 1

A cylindrical type secondary battery was prepared. A diameter of a battery can was 21.05 mm, a thickness of the battery can was 0.3 mm, and a thickness of a bent part formed on an end of an upper portion of the battery can was also 0.3 mm. Also, a thickness of a top cap bonded to the bent part at the upper portion of the battery can was 0.4 mm. Also, a bent length of the bent part was 0.5 mm.

Embodiment 2

A cylindrical type secondary battery was manufactured in the same manner as in Embodiment 1 except that the bent length of the bent part is 1.5 mm.

Experimental Example

While a pressure within the cylindrical type secondary battery manufactured according to Embodiment 1 and Embodiment 2 increased, the pressure within the secondary battery was measured when an entire region of the top cap became spaced apart from the battery can in an integrated state.

In the cylindrical type secondary battery according to Embodiment 1, the pressure within the secondary battery when the entire region of the top cap became spaced apart from the battery can in an integrated state was 33 kgf.

In the cylindrical type secondary battery according to Embodiment 2, the pressure within the secondary battery when the entire region of the top cap became spaced apart from the battery can in an integrated state was 50 kgf.

While the present invention has been described with reference to the specific embodiments, it will be apparent to those skilled in the art that various changes and modifications may be made without departing from the spirit and scope of the invention as defined in the following claims.

The invention claimed is:

1. A secondary battery comprising:
   An electrode assembly;
   A battery can configured to accommodate the electrode assembly and having an open upper portion; and
   A top cap bonded to the upper portion of the battery can, a terminal region protruding upward from the top cap having a wall thickness (t2),
   Wherein an end of the upper portion of the battery can includes a bent part that is bent inward toward the top cap to fix the top cap,
   Wherein the secondary battery is configured such that, when an internal pressure of the battery can exceeds a predetermined value, a region (R) in which the top cap and the bent part overlap each other when viewed from above is reduced by deformation of the top cap or the bent part so as to allow the top cap to be displaced with respect to the battery can in a direction away from the electrode assembly,
   Wherein the battery can has a width (W) defined orthogonally to a longitudinal axis of the battery can, the bent part having a bent length (A) extending towards the longitudinal axis, and a ratio A/W of the bent length (A) of the bent part to the width (W) of the battery can ranging from $2.27 \times 10^{-2}$ to $7.5 \times 10^{-2}$, and
   wherein a ratio A/t2 of the bent length (A) of the bent part to the wall thickness (t2) of the terminal region of the top cap ranges from 1 to 5.

2. The secondary battery of claim 1, wherein the secondary battery is configured such that, when the internal pressure of the battery can exceeds the predetermined value, the top cap becomes displaced with respect to the battery can as a single piece, without being fragmented into a plurality of fragments.

3. The secondary battery of claim 2, wherein the secondary battery is configured such that, when the internal pressure of the battery can exceeds the predetermined value, the bent becomes less bent to allow the top can to become displaced with respect to the battery can.

4. The secondary battery of claim 2, wherein the secondary battery is configured such that, when the internal pressure of the battery can exceeds the predetermined value, a central portion of the top cap is bent upward.

5. The secondary battery of claim 3, wherein the predetermined value is within a range of 30 kgf/cm$^2$ to 60 kgf/cm$^2$.

6. The secondary battery of claim 1, wherein the bent part has a wall thickness (t1),
   And
   A ratio A/t1 of the bent length (A) of the bent part to the wall thickness (t1) of the bent part ranges from 1.43 to 6.

7. The secondary battery of claim 1, wherein the bent length (A) of the bent part ranges from 0.5 mm to 1.5 mm.

8. The secondary battery of claim 1, wherein the width (W) of the battery can ranges from 20 mm to 22 mm.

9. The secondary battery of claim 6, wherein the thickness (t1) of the bent part ranges from 0.25 mm to 0.35 mm.

10. The secondary battery of claim 1, wherein the thickness (t2) of the terminal region of the top cap ranges from 0.3 mm to 0.5 mm.

11. The secondary battery of claim 1, wherein the battery can comprises an iron (Fe) material coated with nickel (Ni).

12. The secondary battery of claim 4, wherein the predetermined value is within a range of 30 kgf/cm$^2$ to 60 kgf/cm$^2$.

* * * * *